Figure 1:
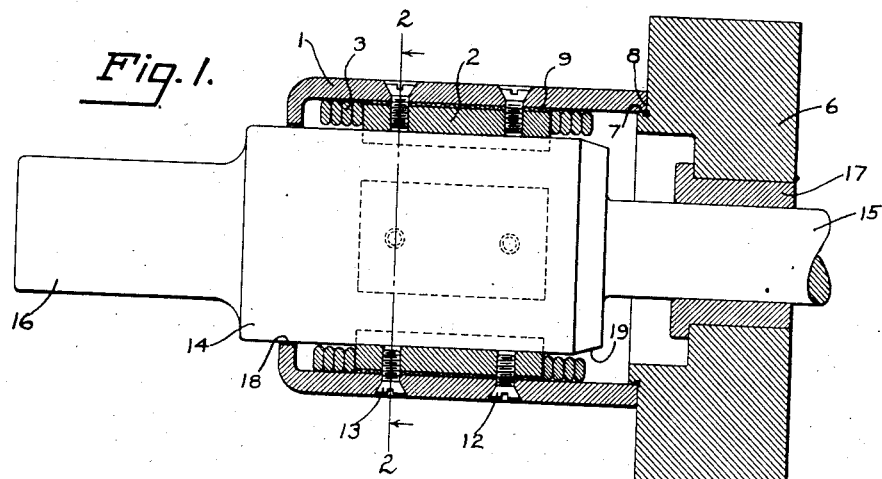

Feb. 24, 1925.

C. H. ALVORD 1,527,162

PROCESS OF MAKING DYNAMO ELECTRIC MACHINES

Filed June 14, 1921

INVENTOR
CLAYTON H. ALVORD
BY
ATTORNEY

Patented Feb. 24, 1925.

1,527,162

UNITED STATES PATENT OFFICE.

CLAYTON HARLEY ALVORD, OF WEST NEWTON, MASSACHUSETTS, ASSIGNOR, BY MESNE ASSIGNMENTS, TO GRAY & DAVIS CORPORATION, A CORPORATION OF MASSACHUSETTS.

PROCESS OF MAKING DYNAMO-ELECTRIC MACHINES.

Application filed June 14, 1921. Serial No. 477,385.

*To all whom it may concern:*

Be it known that I, CLAYTON HARLEY ALVORD, a citizen of the United States, residing at 28 Cross Street, West Newton, in the county of Middlesex, State of Massachusetts, have invented certain new and useful Improvements in Processes of Making Dynamo-Electric Machines; and I do hereby declare the following to be a full, clear, and exact description of the invention, such as will enable others skilled in the art to which it appertains to make and use the same.

The present invention relates to the process of making dynamo-electric machines with particular reference to the assembly of the poles pieces in the frame thereof.

It was customary, heretofore, in manufacturing and assembling dynamo-electric machines, to accurately finish the inner surface of the frame and the rear surfaces of the pole pieces connected to such frame with the finished surfaces of the frame and pole pieces in contact. After the pole pieces were connected in place, the inner ends of the pole pieces were then bored, the armature being later located between the pole pieces.

In accordance with one part of the invention, when assembling the dynamo-electric machine, the pole pieces are placed in position in the frame of the machine after which the pole pieces are adjusted in position concentrically, and then secured in adjusted position. The adjusting of the position of the pole pieces, preferably, is effected by the inserting of a mandrel, which operates as a gauge between the pole pieces. In order to reduce the time and cost of production and, whether or not the pole pieces be adjusted in position by the insertion therebetween of a mandrel, the faces of the pole pieces are shaped before placing them in the frame, thus avoiding the boring operation heretofore required. After adjusting the position of the pole pieces by means of a mandrel, the latter may be removed and the armature inserted between the pole pieces. To maintain a magnetic connection between the frame and the pole pieces, and yet permit a relative movement thereof when adjusting the position of the pole pieces, magnetically-conductive members are, preferably, interposed between the pole pieces and the frame of the machine, such members being compressed when the pole pieces are adjusted in position. In the specific method of assembly, hereinafter described, such members are interposed between the pole pieces and the frame of the machine by placing the members on the pole pieces, loosely connecting the pole pieces in the frame with the members interposed between the pole pieces and the frame, then interposing a mandrel for radially moving the pole pieces into concentric relation with the axis of the machine, as well as partly compressing the yieldable members, and then tightening the loose connection for securing the pole pieces in their adjusted position. For the purpose of facilitating the assembly of the frame and pole pieces in co-axial relation, the frame may be placed on a centering ring before the placing of the pole pieces in the frame, and then the mandrel may be placed in said ring co-axially thereof for adjusting the position of the pole pieces with respect to the axis of such ring.

Figure 2:
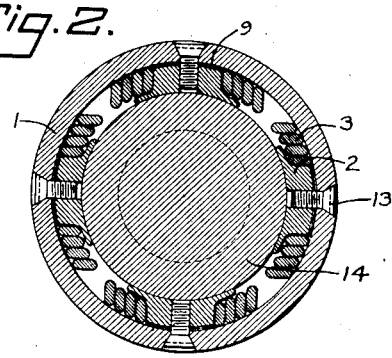
Figure 3:
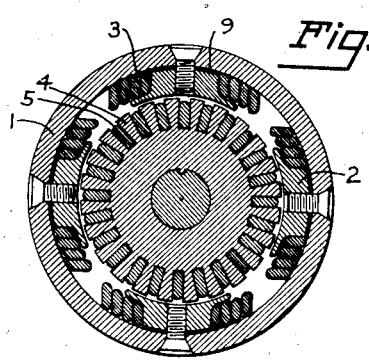
Figure 4:
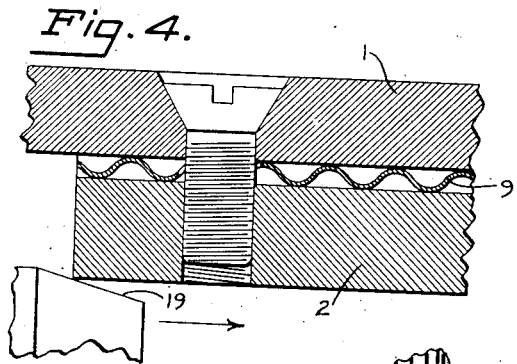
Figure 5:
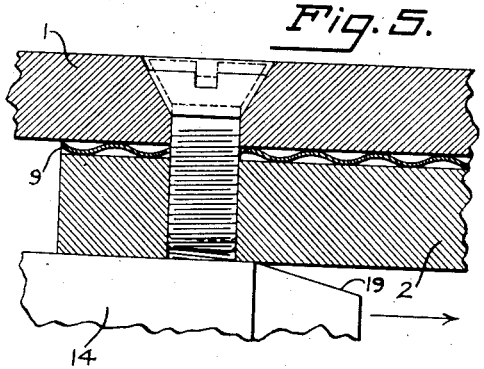
Figure 6:
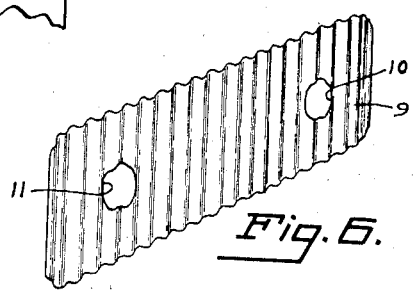

In the accompanying drawing illustrating a machine constructed in accordance with my invention, as for example, of the type associated with the starting, lighting and ignition system of an automobile engine:

Fig. 1 is a longitudinal section of a frame and the pole pieces of the machine mounted into position with an adjusting mandrel therebetween; Fig. 2 is a transverse section taken on line 2—2 of Fig. 1; Fig. 3 is a similar section after the insertion of the armature and the field windings; Figs. 4 and 5 are fragmentary views illustrating different steps of the process of assembling; and Fig. 6 is a perspective view of a corrugated shim used in the process of assembling.

The machine comprises a ring frame 1 and a set of pole pieces 2 about the shanks of which may be located one or more coils or field windings 3, and an armature 4, having winding 5, centralized in the machine, all as are clearly shown in Fig. 3. In the manufacture of such machines, the pole pieces are produced in large quantities on a production basis and have their inner ends shaped with concave surfaces but with their other faces unfinished. When assembling the parts, the ring frame 1 is mounted upon a centering ring 6, which has an annular supporting shoulder 7 with which fits one of the end fit-rings 8 of the frame 1, thus locating the frame 1 concentrically with the axis of the centering ring. The pole pieces are then inserted within the ring and one or more corrugated shims 9, of magnetic material, inserted between the rear unfinished surface of each pole piece and the inner unfinished surface of the frame. The shims are provided with apertures 10 and 11 through which are adapted to extend securing screws 12 and 13. When the pole pieces are located in place within the frame and with the corrugated shims interposed between the pole pieces and the frame, the screws are connected to the pole pieces so as to support the latter loosely within the frame, as is clearly shown in Fig. 4 of the drawing. After the pole pieces are thus loosely positioned, a mandrel or plug 14 is inserted between and in engagement with the inner ends of the pole pieces, the mandrel thus acting as a centering gauge. This mandrel comprises an end arbor 15 and a handle portion 16, the arbor 15 being adapted to be centrally positioned within a bushing 17 coaxially fixed within the centering ring 6. In this way the axis of the mandrel 14 and the frame 1 are concentric, the outer fit-ring 18 of the frame member 1 cooperating with the mandrel 14 to center it at its outer end. The forward end of the mandrel is tapered as at 19 so as to facilitate the longitudinal insertion of the mandrel into place between the pole pieces 2, as is shown in Fig. 4. When thus inserting the mandrel, the pole pieces will be caused to move or expand radially against the corrugated shims to a position such as is shown in Fig. 5 of the drawing, the corrugated shims being in the meanwhile compressed as a result of such expansion or radial movement of the pole pieces. The outside diameter of the mandrel determines the dimension of the bore of the pole pieces. Ordinarily, this dimension is slightly larger than the outside diameter of the armature eventually placed between the pole pieces. The screws 12 and 13 are then drawn or set up firmly by hand, in order to hold the pole pieces in their adjusted or expanded concentric position, as shown in Fig. 5, the latter figure also showing the position of the screws in dotted lines before the setting up thereof, and in full lines after the setting up thereof. By the term "concentric position" is meant that the corresponding points of the several pole pieces are equi-distant from the axis of the frame and machine or lie in circles that are concentric with such axis. After the screws have been set-up, they may be set in any suitable manner in order to prevent them from working loose. In this way the amount of machining heretofore required is avoided, and also the previous necessity of assembling the pole pieces and boring them after assembly in the frame is also avoided, yet, the correct final inside bore is obtained, even with closer limits, than heretofore, by the mode of adjustment above described. After the screws are tightened, and set, the mandrel 14 may be withdrawn and the armature 4 inserted in place, as above stated, the centering ring being removed and the end plates, containing suitable bearings for the armature, being connected to the frame 1.

Inasmuch as the amount of iron usually used in a pole piece at the surface of contact with the field frame is nearly double that required for an efficient flux of the magnetic lines produced by the field current in the field coils, the use of corrugated shims with the major portion of their surfaces forming an effective area of contact with the juxtaposed surfaces of the pole piece and frame, will not increase the magnetic reluctance therebetween. It has been found from experimentation and tests that this mode of mounting improves the operation of the generator so that the same amount of current may be obtained with a given generator when running at a lower speed than that heretofore required, or when running at normal speeds larger current will be obtained. Inasmuch as the machining of the rear surface of the pole pieces and the inner surface of the frame is avoided, cost of production is greatly reduced and the difficulty of boring the inner ends of the pole pieces, after assembly, is also avoided, such ends being more conveniently previously formed upon the pole pieces.

Having thus described my invention what I claim is:

1. In a method of assembling a dynamo-electric machine, the steps of placing pole pieces in position in the frame of said machine, inserting a mandrel between said pole pieces, adjusting the position of said pole pieces, and securing said pole pieces in adjusted position.

2. In a method of making a dynamo-electric machine, the steps of shaping the faces of pole pieces, placing said pole pieces in the frame of said machine, inserting a mandrel between said pole pieces for adjusting the position of said pole pieces, and fixing said pole pieces in adjusted position.

3. In a method of making a dynamo-electric machine, the steps of shaping the faces of pole pieces, placing said pole pieces in the frame of said machine, inserting a mandrel between said pole pieces for adjusting the position of said pole pieces, fixing said pole pieces in adjusted position, removing said mandrel, and inserting an armature between said pole pieces.

4. In a method of assembling a dynamo-electric machine, the steps of interposing yieldable magnetically-conductive members between the pole pieces and the frame of the machine, adjusting the position of said pole pieces and compressing said members, and securing said pole pieces in adjusted position.

5. In a method of assembling a dynamo-electric machine, the steps of interposing yieldable magnetically-conductive members between the pole pieces and the frame of the machine, inserting a mandrel between said pole pieces for adjusting the position of said pole pieces in said frame and compressing said members, and securing said pole pieces in adjusted position.

6. In a method of assembling a dynamo-electric machine, the steps of interposing yieldable magnetically-conductive members between the pole pieces and the frame of the machine, loosely connecting said pole pieces in said frame with said members interposed between said pole pieces and frame, adjusting the position of said pole pieces, and tightening said loose connections for fixing said pole pieces in adjusted position.

7. In a method of assembling a dynamo-electric machine, the steps of placing yieldable magnetically-conductive members on the pole pieces of said machine, loosely connecting said pole pieces in the frame with said members interposed between said pole pieces and frame, interposing a mandrel for spacing said pole pieces from the center of said machine and compressing said members, and tightening said loose connection for securing said pole pieces to said frame in said spaced position.

8. In a method of assembling a dynamo-electric machine, the steps of placing yieldable magnetically-conductive members on the pole pieces of said machine, loosely connecting said pole pieces to the frame of said machine with said members interposed between said pole pieces and frame, interposing a mandrel for spacing said pole pieces from the axis of said machine and compressing said members, and tightening said loose connection for securing said pole pieces in spaced position.

9. In a method of assembling a dynamo-electric machine, the steps of placing yieldable magnetically-conductive members on the pole pieces of said machine, loosely connecting said pole pieces to the frame of said machine with said members interposed between said pole pieces and frame, interposing a mandrel for radially moving said pole pieces into concentric relation with the axis of said machine and partly compressing said members, and tightening said loose connection for fixing said pole pieces in adjusted position.

10. In a method of assembling a dynamo-electric machine, the steps of placing the frame of the machine on a centering ring, placing pole pieces in said frame, placing a mandrel between said pole pieces co-axially of said ring for adjusting the position of said pole pieces with respect to the axis of said ring, and fixing said pole pieces in adjusted position.

11. In a method of assembling a dynamo-electric machine, the steps of placing the frame of the machine on a centering ring, placing pole pieces in said frame, placing a mandrel between said pole pieces co-axially of said ring for adjusting the position of said pole pieces with respect to the axis of said ring, fixing said pole pieces in adjusted position, removing said mandrel, removing said frame from said ring, and inserting an armature between said pole pieces.

12. In a method of assembling a dynamo-electric machine, the steps of placing the frame of said machine on a centering ring, placing pole pieces in said frame, interposing yieldable magnetically-conductive members between said pole pieces and said frame, loosely connecting said pole pieces in place with said members in interposed position, inserting a mandrel between said pole pieces and co-axially of said ring for radially adjusting said pole pieces into concentric relation with the axis of said ring and machine for compressing said members, drawing up the connection between said pole pieces and frame for securing said pole pieces in adjusted position, removing said mandrel, removing said frame from said ring, and inserting an armature between said pole pieces.

In testimony whereof I affix my signature.

CLAYTON HARLEY ALVORD.